United States Patent
Syed et al.

(10) Patent No.: US 9,050,898 B2
(45) Date of Patent: Jun. 9, 2015

(54) WAVE FIN BATTERY MODULE

(75) Inventors: Sami A. Syed, Windsor (CA); Robert J. Heydel, Clawson, MI (US); John G. Dorrough, Oak Park, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 669 days.

(21) Appl. No.: 13/276,409

(22) Filed: Oct. 19, 2011

(65) Prior Publication Data

US 2013/0101881 A1    Apr. 25, 2013

(51) Int. Cl.
| | |
|---|---|
| H01M 10/42 | (2006.01) |
| B60L 11/18 | (2006.01) |
| H01M 2/10 | (2006.01) |
| H01M 10/04 | (2006.01) |
| H01M 10/613 | (2014.01) |
| H01M 10/625 | (2014.01) |
| H01M 10/647 | (2014.01) |
| H01M 10/6555 | (2014.01) |

(52) U.S. Cl.
CPC ............... B60L 11/18 (2013.01); *Y10T 29/4935* (2015.01); *Y10T 29/49826* (2015.01); H01M 2/1077 (2013.01); H01M 10/0481 (2013.01); H01M 10/5004 (2013.01); H01M 10/5016 (2013.01); H01M 10/5032 (2013.01); H01M 10/5055 (2013.01); B60L 11/1874 (2013.01); B60L 11/1879 (2013.01); *Y02T 10/7005* (2013.01); *Y02T 10/705* (2013.01); *Y02T 10/7016* (2013.01); *Y02T 10/7011* (2013.01)

(58) Field of Classification Search
CPC ................... H01M 10/5004; H01M 10/5008; H01M 10/5059; H01M 10/5032; H01M 10/5055
USPC ........................................... 429/120, 149, 152
See application file for complete search history.

(56) References Cited

U.S. PATENT DOCUMENTS

| | | | |
|---|---|---|---|
| 2005/0089750 A1* | 4/2005 | Ng et al. | 429/120 |
| 2007/0259258 A1 | 11/2007 | Buck | |
| 2009/0325053 A1* | 12/2009 | Koetting et al. | 429/120 |
| 2010/0291428 A1* | 11/2010 | Graban et al. | 429/120 |
| 2010/0307723 A1* | 12/2010 | Thomas et al. | 165/104.33 |
| 2011/0151300 A1* | 6/2011 | Herrmann | 429/120 |
| 2011/0267778 A1* | 11/2011 | Eckstein et al. | 361/704 |
| 2012/0021260 A1* | 1/2012 | Yasui et al. | 429/53 |

FOREIGN PATENT DOCUMENTS

| | | |
|---|---|---|
| CN | 201289891 Y | 8/2009 |
| CN | 102055027 A | 5/2011 |
| WO | WO 2010081510 A1 * | 7/2010 |
| WO | WO 2011092773 A1 * | 8/2011 |

* cited by examiner

*Primary Examiner* — Zachary Best
(74) *Attorney, Agent, or Firm* — Dinsmore & Shohl LLP

(57) ABSTRACT

A battery module includes two or more battery cells and a continuous wave fin disposed between the battery cells. The construction of the wave fin is generally one-piece such that fewer parts are needed to form the battery module. In a preferred form, the wave fin is made from a high thermal conductivity material to promote removal of heat generated by the batteries during their operation. Portions of the wave fin not in direct contact with the battery cells may be placed in direct contact with a heat sink to help remove excess heat from the module. Expansion units or related additional structure may be placed, along with the various battery cells, between the generally serpentine-shaped wave fin to provide uniformity in cell spacing. A method of making one or more battery modules is also described.

17 Claims, 7 Drawing Sheets

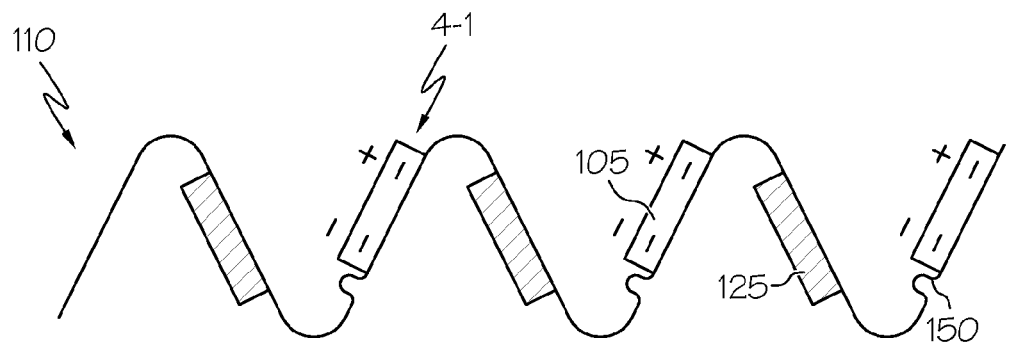
FIG. 7E
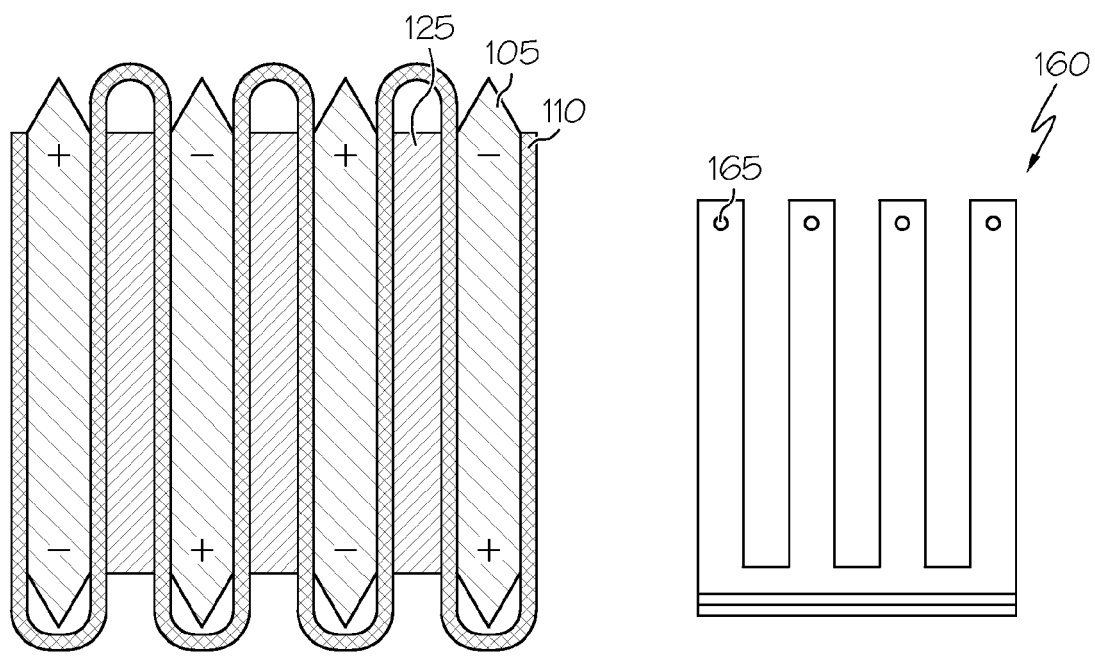
FIG. 7F
FIG. 8

WAVE FIN BATTERY MODULE

FIELD OF THE INVENTION

This invention relates generally to batteries, and more particularly to a battery module with enhanced thermal efficiency and reduced packaging complexity.

BACKGROUND OF THE INVENTION

Hybrid and electric motors provide an alternative to conventional means of vehicular motive power by either supplementing (in the case of hybrid vehicles) or completely replacing (in the case of electric vehicles) a traditional internal combustion engine (ICE). One form of such alternative vehicle is known as an extended range electric vehicle (EREV). In one embodiment of the EREV, primary electric drive is achieved with a battery that acts as a direct current (DC) voltage source to a motor, generator or transmission that in turn can be used to provide the energy needed to rotate one or more of the vehicle's wheels. Once the electrical charge from the battery has been depleted, backup power may come from an ICE to provide auxiliary onboard electrical energy generation. The Chevrolet Volt is an EREV being manufactured by the Assignee of the present invention.

Various battery architectures may be employed to provide motive or related power to an EREV, including nickel-metal hydride batteries, lead acid batteries, lithium polymer batteries and lithium-ion batteries. Of these, the lithium-ion battery appears to be particularly promising for vehicular applications. One consideration, irrespective of the battery form, is removal of excess heat generated by the electrochemical reaction taking place within the battery during operation. Current battery internal heat exchangers require numerous components and sealing connections, as well as complicated manufacturing processes.

One known method for cooling battery cells is to bring two cells into face contact with a cooling fin through which coolant flows. The cooling fins are connected by integrating an inlet and outlet header hole on both sides of the fin. The inlet and outlet headers are then formed by stacking two or more fins together, and connecting the inlet and outlet header holes. An o-ring seal (or similar seal) may be used to form the seal between two fins. The seals for both inlet and outlet are typically integrated into a frame, which holds the cells and fins in place in the stack. An example of this type of system is shown in FIG. 1 where an expanded view of a battery pack 10 is shown. Individual battery cells 15 are separated by cooling fins 20 such that heat generated by the battery cells 15 is conducted into the cooling fins 20. The cooling fins 20 include a cooling inlet 25 on one side and a cooling outlet 30 on the other with channels 35 to fluidly couple the inlet 25 to the outlet 30. Two battery cells 15 and a cooling fin 20 can be contained in a frame 40. There are seals 45 on both sides of the cooling fin 20 for the cooling inlet 25 and cooling outlet 30; these seals 45 may be integrated into the frame 40 or formed separately and attached subsequently. In addition to the seals 45, this arrangement requires multiple components, as well as a complicated assembly process.

SUMMARY OF THE INVENTION

According to one aspect of the present invention, a battery module is disclosed that includes at least two battery cells and a continuous wave fin formed around and between battery cells. The wave fin defines a generally serpentine-shape made up of a repeating sequence of straight wave fin sections coupled to one another by wave crest sections where each wave crest section connects two adjacent straight wave fin sections.

Optionally, in one particular embodiment of the wave fin, it defines a continuous structure throughout a substantial entirety of the battery module. In another option, a compliant expansion unit may be disposed between one of the battery cells and at least another of the battery cells or the straight section of the wave fin. The expansion unit may be secured to one or more of the adjacent straight sections by any known method, such as by adhesive. In one particular form, one or both sides of the expansion unit are in contact with an adjacent one of the straight sections. In another form, one (or both) sides of the expansion unit are in contact with an adjacent one of another battery cell. A guide groove may be formed as part of one of the straight sections. In another option, one or more sides of each battery cell may be made to be in contact with an adjacent one of the straight sections of the wave fin. In another option, one side of each battery cell is in contact with an adjacent one of the straight sections while another side is in contact with an expansion unit. In still another optional form, one side of each battery cell is in contact with an adjacent one of the straight sections while another side is in contact with another battery cell. A heat sink may be coupled to the battery module. In a preferred form, it is attached to the module along the module surface that coincides with the wave crest portion (also referred to as crest section) of the wave fin. In a preferred form, the heat sink is attached to the battery module in such a manner as to compress the generally rounded ends defined by the crest section; in this way, the crest section becomes deformed such that it defines a generally planar contact surface that enhances its contact area with that of the generally planar surface of the adjacent heat sink. It will be appreciated that variations on the shape of the rounded end may be employed such that the appropriate amount of surface contact and interface pressure is established. In one particular form, the heat sink may include passages for liquid coolant to travel through as a way to enhance the ability of the heat sink to convey excess heat away from the battery module. An additional layer of thermal interface material may also be disposed between the crest sections and the heat sink; such material may be tailored to the particular heat transfer needs of the battery module.

According to another aspect of the invention, a vehicular power source includes one or more battery modules and an electric motor cooperative with such module or modules. Electric current generated by the battery module provides motive force to a vehicle through the motor. The module includes numerous battery cells; and a wave fin defining a generally serpentine shape with alternating straight sections and crest sections such that at least one of said plurality of battery cells is disposed in a the region of said wave fin defined between adjacent straight sections. Within the present context, a vehicle is any form of human transportation that can used mechanized (i.e., motorized) power as a propulsion source. As such, a vehicle may include a car, truck, aircraft, spacecraft, watercraft, motorcycle or variants of the same. Likewise, an electric motor may include any form known in the art, such as an electric induction motor that has a rotating armature (rotor) surrounded by a coil-wound stationary field (stator), where it will be appreciated by those skilled in the art that when electric current is passed through the windings of the stator, a part of the stator known as the pole (which may be made up of a magnetically permeable material, such as iron) around which the windings are wrapped becomes magnetically energized, which in turn imparts an electromagnetic force to the rotor, causing it to rotate. In motive applications, a shaft attached to the rotor can be used to provide propulsive force to a vehicle through the turning of one or more linked wheels.

Optionally, a heat sink is included that is coupled to the battery module such that thermal contact between them is enhanced. In particular, such enhancement can come from a slight interference fit between the two where the heat sink presses against the crest sections to compress the contact surfaces of the crest sections; such compression results in a general plateau-like flattening of the contacted crest section portion. Such flattening out acts to increase the surface area contact between the heat sink and wave fin, thereby enhancing heat transfer between them. As indicated elsewhere, the crest sections may be curvilinear in shape, although other shapes that promote the flattening out of the crest sections as a way to enhance contact surface area with the heat sink is also desirable. Such heat transfer may be enhanced with an optional cooling fluid path being formed in the heat sink. An expansion may also be used which, as with the previous aspect, may be made from a compliant material, and may be disposed in various places within the serpentine pattern of the wave fin. For example, the expansion unit may be placed between one of the battery cells and another of battery cell. In another form, the expansion unit may be placed between one of the battery cells and one of the straight sections of the wave fin.

According to another aspect of the invention, a method of making a battery module is disclosed. The method includes corrugating a conductive sheet such that a continuous wave fin is formed. Each region formed by the wave fin defines a space or volume between two adjacent straight sections and the crest section that connects the two adjacent straight sections. These regions allow for the placement of one or more of battery cells and expansion units. The method further includes placing one or more battery cells between at least some of the regions formed between adjacent straight sections.

Optionally, the method includes placing a compressible expansion unit between at least some of the straight sections. The method may additionally include placing a heat sink in thermal communication with at least a portion of the crest section; this may be further enhanced by placing a layer of thermal interface material between the one or more crest sections and the heat sink. In one preferred form, placing a heat sink in thermal communication with the crest section causes a flattening out of at least the portion of the crest section that is in contact with the generally planar surface of the heat sink; such flattening out serves to increase the surface area contact (and concomitant thermal contact) between them. As with the previous embodiments, other features, such as guide grooves, may also be included. Likewise, a comb-shaped part may be included to ensure that thermal contact between the crest sections and heat sink is maintained.

BRIEF DESCRIPTION OF THE DRAWINGS

The following detailed description of specific embodiments can be best understood when read in conjunction with the following drawings, where like structure is indicated with like reference numerals and in which:

FIGS. 7A through 7F illustrate one method of making the battery module of FIG. 2;

FIG. 8 is an illustration of a part for fastening the wave crests to the heat sinks.

DETAILED DESCRIPTION OF THE PREFERRED EMBODIMENTS

Figure 1:
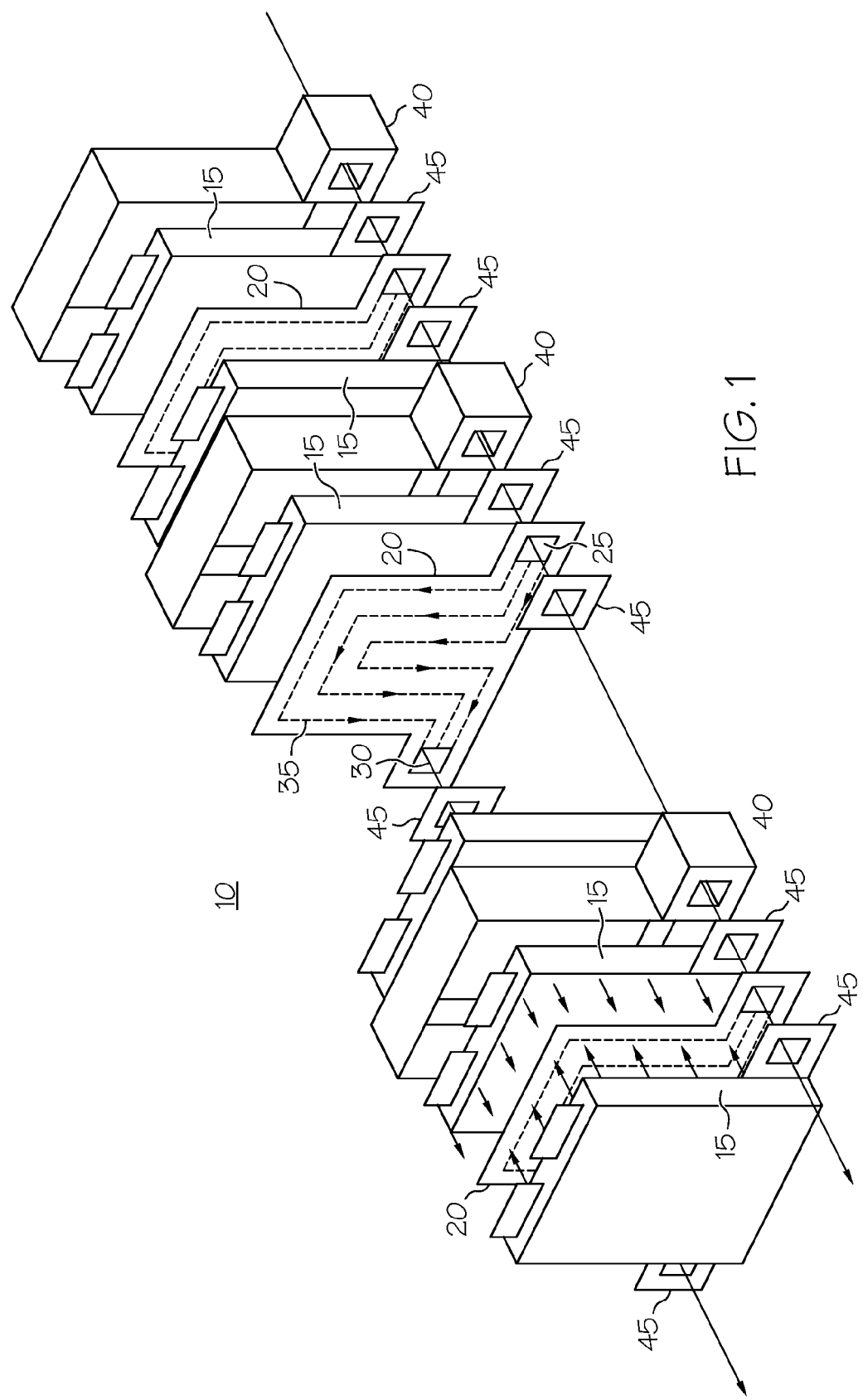
FIG. 1 is an illustration of a prior art arrangement of cooled battery cells.
Figure 2:
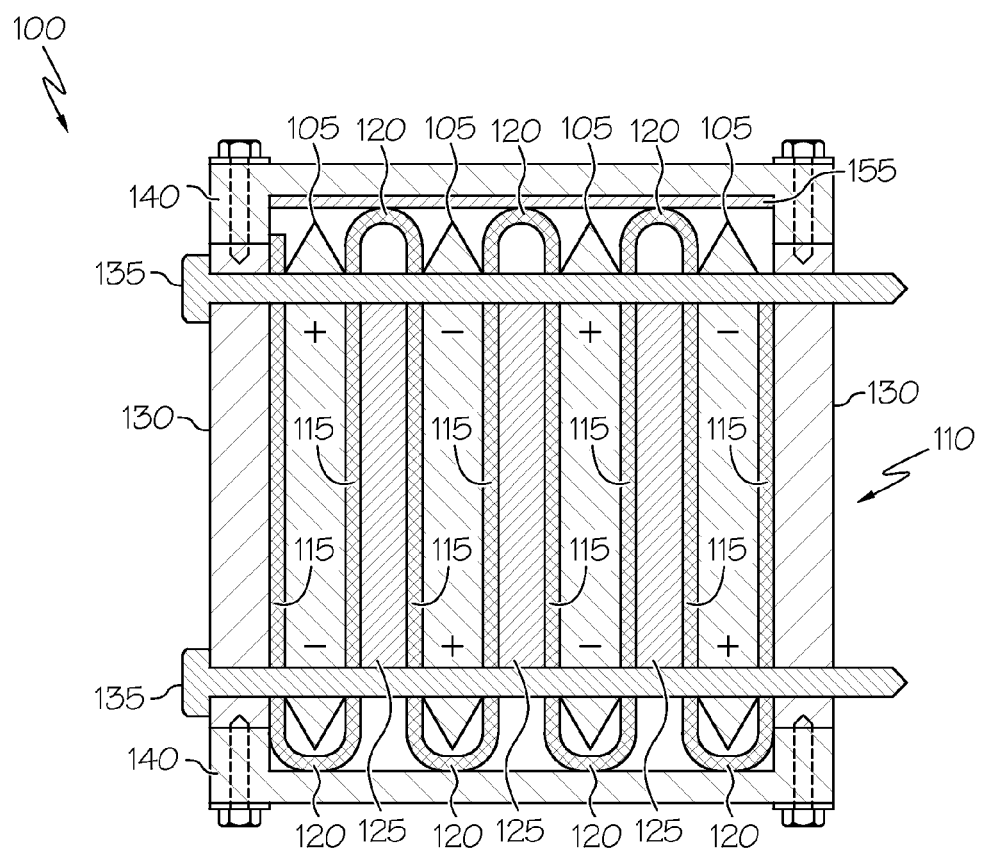
FIG. 2 is an illustration of one arrangement of a battery module according to an aspect of the present invention.
Figure 3:
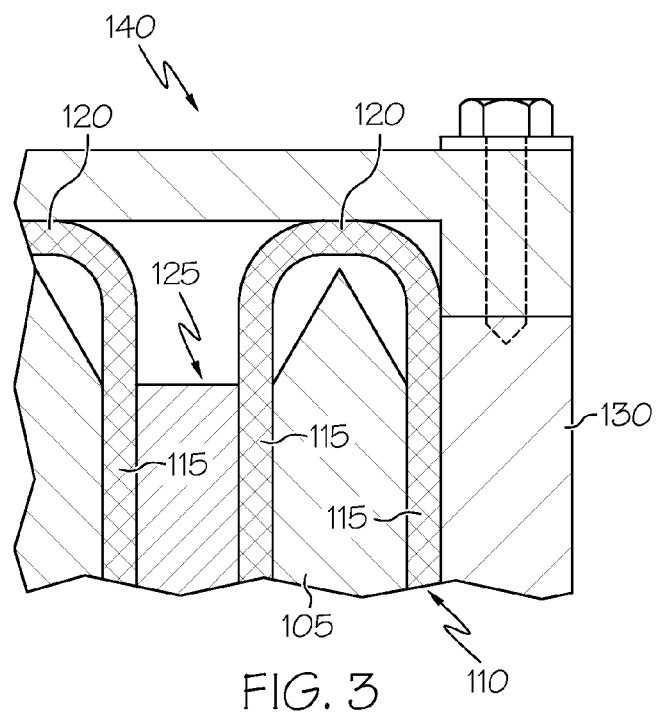
FIG. 3 is an illustration of a portion of the battery module of FIG. 2 in more detail.

Referring to FIGS. 2, 3 and 8, one embodiment of a battery module 100 of the present invention is shown, where numerous individual battery cells 105 are axially separated from one another by a serpentine-shaped wave fin 110. Collectively, the wave fin 110 and the attached battery cell (or cells) 105 make up a wave fin assembly. The wave fin 110 has straight sections 115 that extend adjacent to the generally planar surfaces of the various battery cells 105, as well as crest sections 120 which connect adjacent straight sections 115; the cooperation of a crest section 120 with two adjacent straight sections 115 forms a voluminous region into which battery cells 105 may be placed. In this embodiment, the straight sections 115 are preferably in contact with both sides of each of the battery cells 105. In the present context, the term "side" as it pertains to the individual battery cells 105 includes the large area generally planar surfaces of the cell rather than the smaller area edges. The placement of the cells 105 between a single, continuous sheet of the wave fin 110 provides a simple, robust battery internal heat exchanger which can enhance thermal efficiency, as well as lead to a significant reduction in part count; this in turn allows for a smaller battery module. For example, the design allows simplification of the battery internal heat exchanger by virtue of fewer components being used in the module 100, as plastic frames and individual cooling fins are not required. One continuous wave fin 110 can replace multiple frames and fins. Relatedly, such a configuration improves reliability and simplifies manufacturing.

As additionally shown, the battery module 100 has upper and lower heat sinks 140, along with end plates 130 situated on opposite ends of the stacked cells 105. The end plates are secured to each other by tie rods/fasteners 135. As shown with particularity in FIG. 3, upon being secured to the end plates 130 (such as through bolts or related fasteners), the relatively rigid heat sinks 140 produce a flattening shape in the crest sections 120 of the more deformable wave fin 110. The significant contact area, coupled with the secure connection, promotes a robust interface between the heat sink 140 and the wave fin 110. While one preferable form of the crest sections 120 is curvilinear-shaped, the present embodiment is not so limited, as it will be appreciated by those skilled in the art that other (such as peaked, pointy or related triangular-shaped) forms may be used, so long as they deform into a high surface-area contact region upon contact with the adjacent surface of the heat sink 140.

Figure 9:
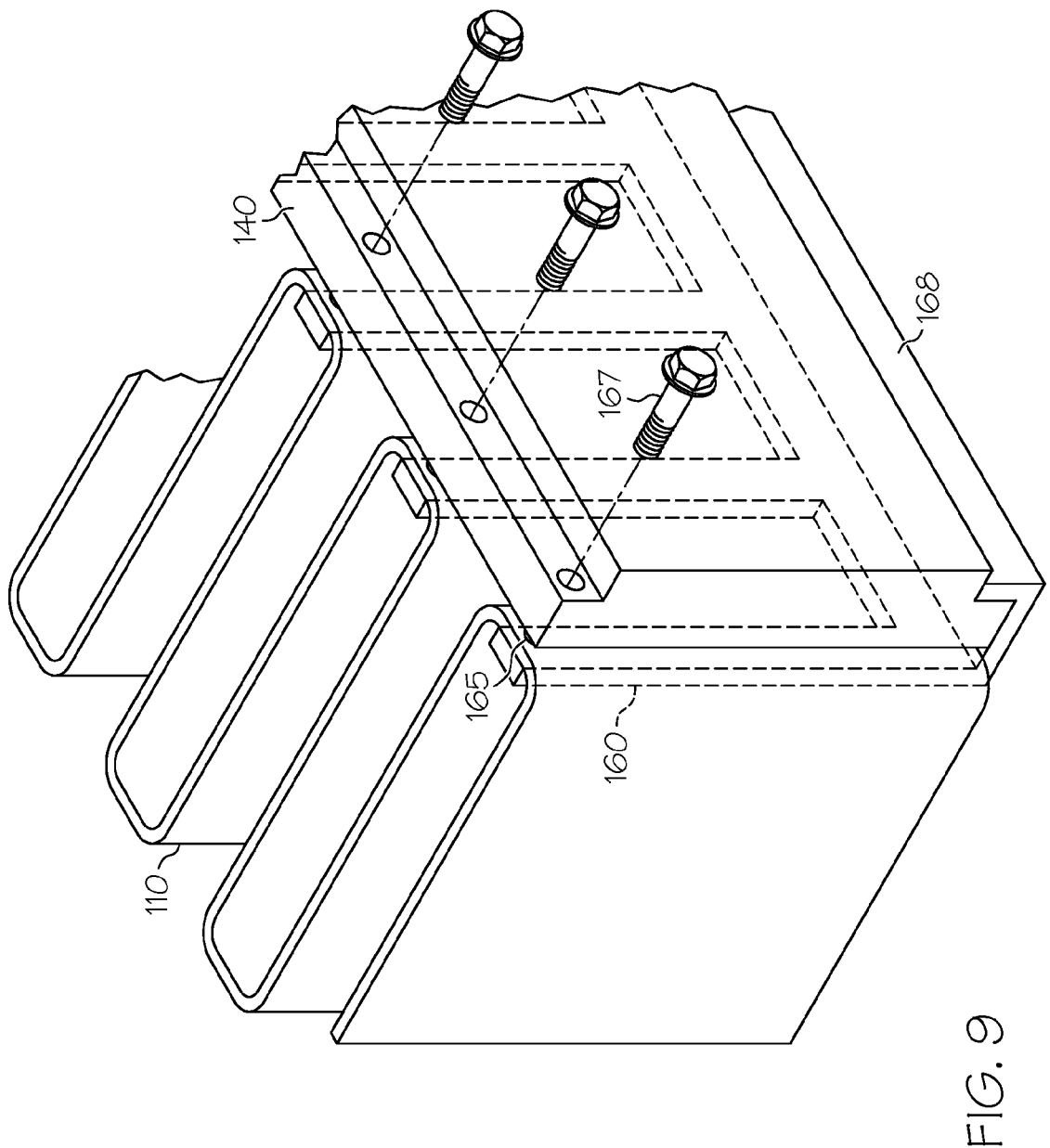
FIG. 9 is an illustration of one way that the part of FIG. 8 may be used.

Referring with particularity to FIGS. 8 and 9, the optional comb piece 160 (also referred to herein as a comb-shaped part) may be used to positively fasten the crest sections 120 to the heat sinks 140, such as through rivets, screws or related fasteners that can be secured via apertures 165. By virtue of the high thermal conductivity of the wave fin 110 (which may, as stated above, be made from aluminum or a related conductive material) coupled with a preferable one-piece construction, the heat generated in each battery cell 105 is primarily conducted along the surface defined by the straight section 115 and wave crest section 120 and into the heat sink 140. It also permits cooling on both sides of the battery cell 105, if desired. Likewise, the deformable construction of the wave fin 110 also promotes more cross-module dimensional tolerance during module 100 assembly; such increased flexibility allows for reduced tolerances on how flat the various contacting surfaces need to be, thereby simplifying and reducing the cost of manufacturing the battery module 100. In the present context, the terms "one-piece" and "continuous" pertaining to the construction of the wave fin 110 are meant to be interchangeable. For example, the wave fin 110 may be formed from a single, elongated sheet of appropriate material (such as the aforementioned aluminum or one of its alloys), thereby trivially satisfying the one-piece requirement. Likewise, numerous discrete sheets can be secured together (such as by welding, adhesives, fasteners or other techniques known in the art) such that the construction and operation of the wave fin 110 takes on single-piece attributes. In one form, the comb piece 160 could be engineered out of conductive material with appropriate stiffness properties to enable even contact and pressure throughout the height of the individual fin 110 to the heat sink 140. The comb piece 160 could have a lip or related interlocking feature 168 formed at either the bottom or top (bottom shown) to secure with the heat sink 140; such construction simplifies the attachment by requiring securing (such as through fasteners 167 extending through apertures 165) only in the opposing top or bottom.

Expansion units 125 may be situated between adjacent straight sections 115 which are located between adjacent battery cells 105. As can be seen, the overall shape of the expansion units 125 is generally similar to that of the battery cells 105 as discussed above; as such, the term "side" as it pertains to the individual expansion units 125 describes the large area generally planar surfaces of the cell rather than the smaller area edges. In viewing the construction edge-on (such as in FIG. 2), the stacking order is as follows: straight section 115-battery cell 105-straight section 115-expansion unit 125-straight section 115-battery cell 105-straight section 115-expansion unit 125, and so forth. In one exemplary form, the expansion units 125 can be sheets or layers of foam or some related lightweight, relatively low thermal-conductivity compliant material. In the present context, a sheet or layer of material is considered to be compliant when compressive or related forces applied against it will tend to cause some degree of deformability. The expansion unit 125 compensates for the cell tolerance and expansion variation in the through-the-thickness direction of the cells 105.

Figure 4:
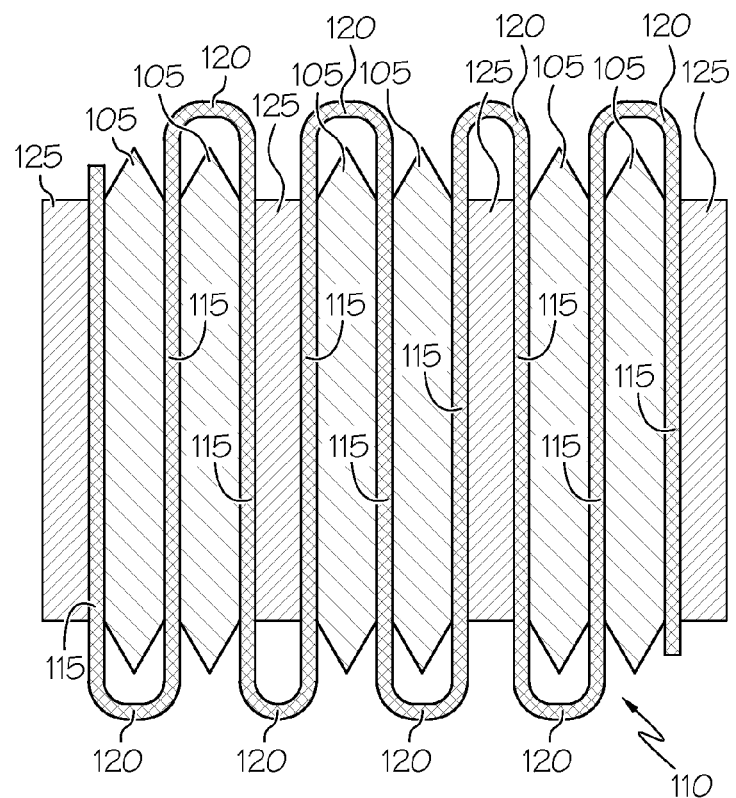
FIG. 4 is an illustration of a portion of another arrangement of the battery module.
Figure 5:
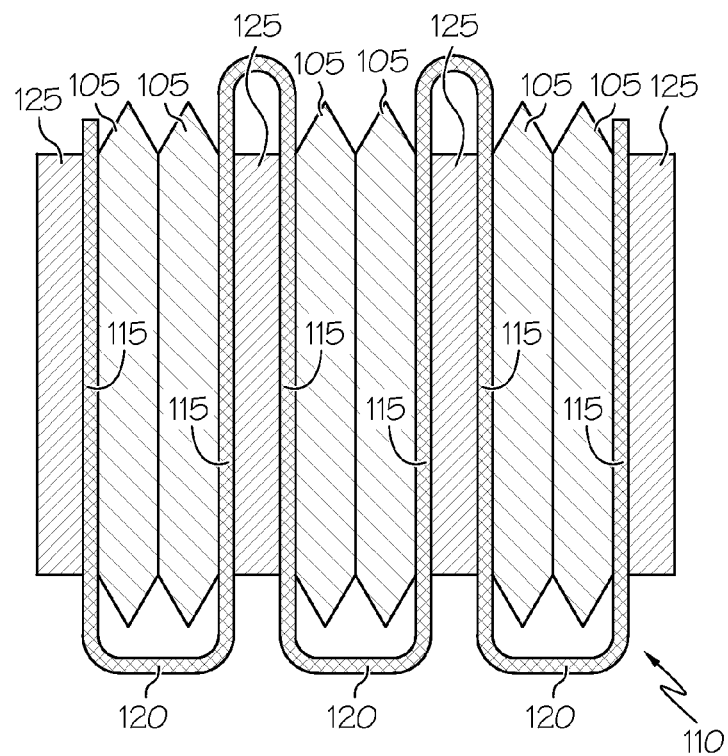
FIG. 5 is an illustration of a portion of another arrangement of the battery module.
Figure 6:
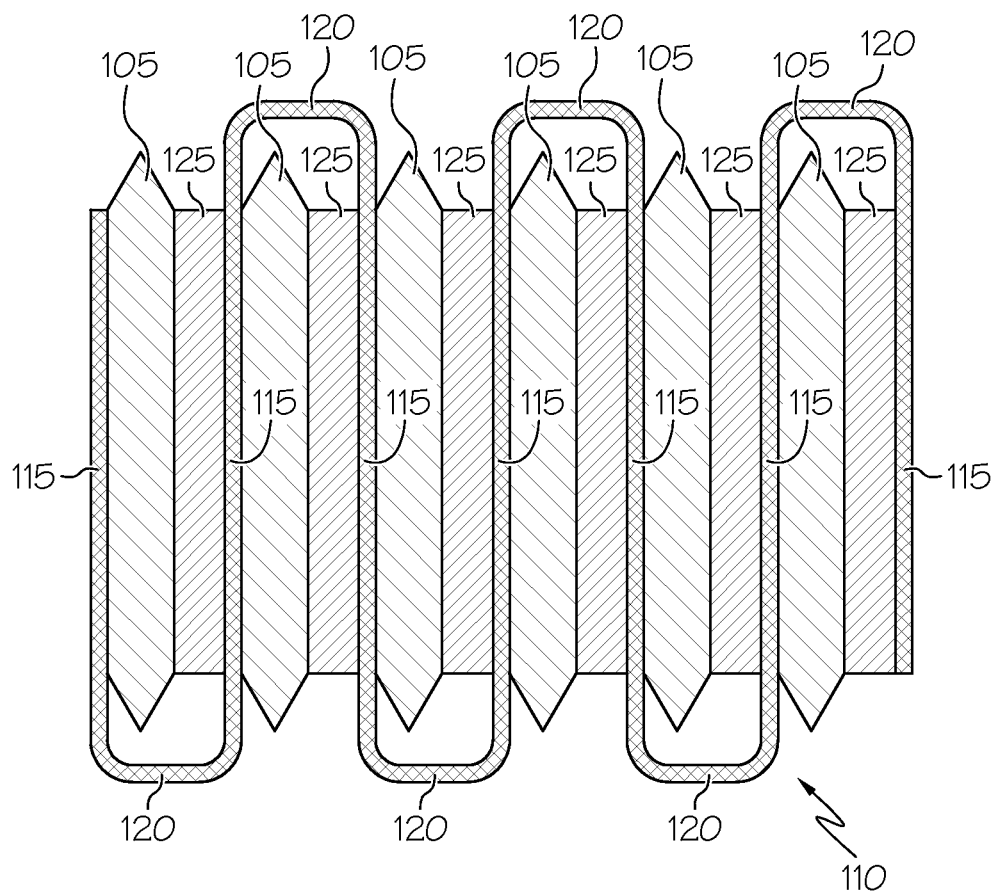
FIG. 6 is an illustration of a portion of another arrangement of the battery module.

Referring next to FIGS. 4, 5 and 6, alternate embodiments of the interwoven nature of the wave fin 110 to the battery cells 105 are shown. In the embodiment depicted in FIG. 4, the straight sections 115 are interspersed between each of the battery cells 105, where pairs of cells 105 are situated adjacent one another, rather than the purely alternating cell-wave fin-cell format of FIG. 2. Other arrangements are possible, depending on the needed cooling performance and cell 105 configuration. For example, there could (as shown in FIG. 5) be arrangements in which there are straight sections 115 placed between every two battery cells 105 or every three battery cells (not shown). Other arrangements are possible as would be understood by those of skill in the art. For example, expansion units 125 may be disposed between adjacent battery cells 105 (as shown in FIGS. 2 and 6, for example), every two battery cells (see FIGS. 4 and 5 for example), or between every three battery cells (not shown).

Figure 7A:
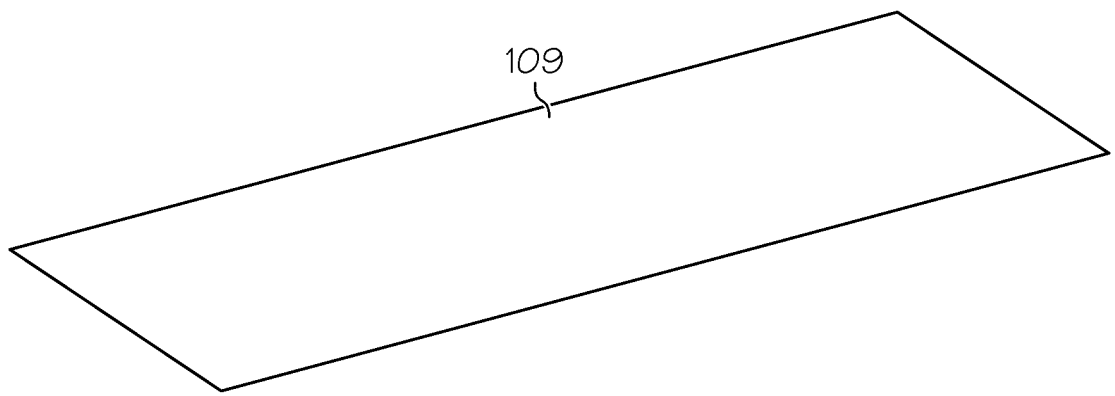
Figure 7B:
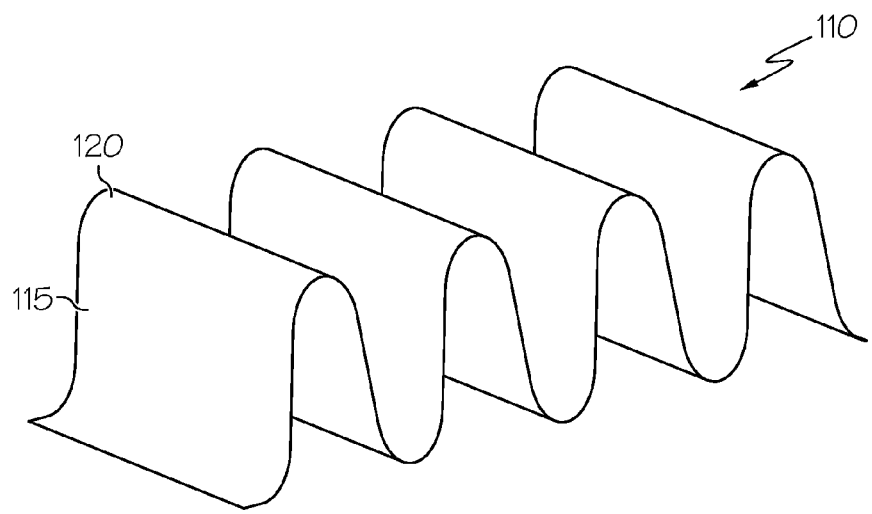
Figure 7C:
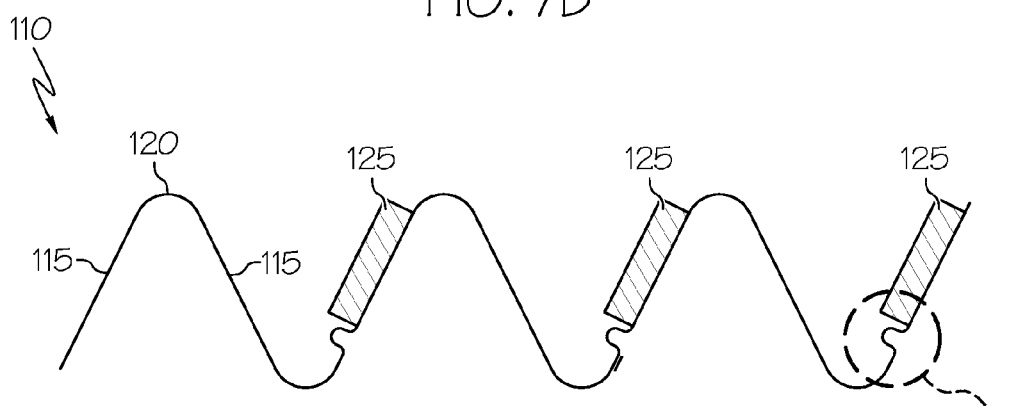
Figure 7D:
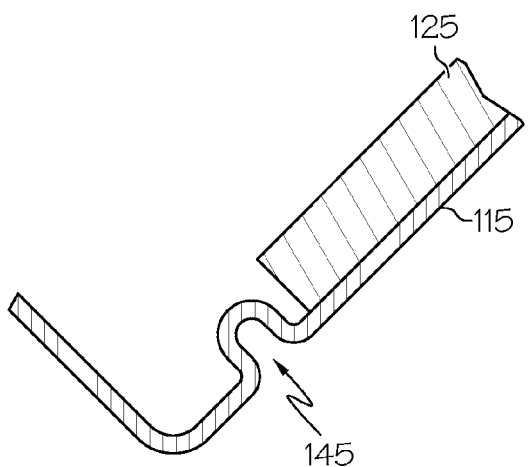

Referring next to FIGS. 7A through 7F, steps associated with one method of making the battery module 100 are illustrated. First, the metal sheet (which in one non-limiting example, may comprises a flat sheet 109 of aluminum or aluminum alloy) of FIG. 7A is corrugated into the wave fin 110 of FIG. 7B to define straight sections 115 with crest sections 120 joining two adjacent straight sections 115. Because the coolant flow is only at the sides of the module 100, instead of between every battery cell or every other battery cell, there are fewer seals with the wave fin 110 of the present invention than with other designs. This reduction in sealing equipment means the design provides lower material and manufacturing costs. Likewise, because seals (which are very sensitive to surface cleanliness) are not needed, only normal cleanliness standards are required for the metal sheet. As shown in general in FIG. 7C and in more detail in FIG. 7D, expansion units 125 may be placed on one side of the straight wave fin sections 115, while locating grooves 145 can be incorporated into the wave fin 110 to provide seating locations for expansion units 125. The expansion units 125 can be attached to the straight wave fin sections 115 using an adhesive, if desired. FIG. 7E shows guide grooves 150 that are, in a manner generally similar to that of locating grooves 145, formed in the straight wave fin sections 115 to position the battery cells 105. The locating grooves 145 and battery cell guide grooves 150 can be designed into the wave fin 110 as a way to provide crush initiation functionality for when the heat sink 140 pushes on the wave fin crest sections 120 and flattens them out. Optimization of such a design may be achieved through known means, such as computer-aided-engineering (CAE) or like approaches. After the cells 105 and expansion units 125 are secured to the wave fin 110, the assembly is then compressed as shown in FIG. 7F. Although not shown for the sake of simplicity in FIG. 7F, it will be appreciated that the locating grooves 145 and the guide grooves 150 of FIGS. 7D and 7E are (if used) still present in the compressed assembly. It will be further appreciated that the precise shape of the grooves 145, 150, as well as that of the wave fin crest 120 may be optimized for weight, cost, manufacturability, thermal or mechanical properties or the like, and that such variations are understood to be within the scope of the present invention. The end plates 130 and heat sink frames 140 are then attached to produce the battery module 100 of FIG. 2.

The heat sinks 140 have a channel through which coolant (for example, liquid coolant) may be pumped. The heat sinks 140 can be formed by stamping two metal (for example, aluminum) sheets and brazing or welding them together, where surface undulations may correspond to the formed channels. Because the heat sinks 140 are located on the sides of the base of module 100, only one coolant inlet and outlet are needed for each heat sink 140, thereby eliminating the need for multiple seals for each cooling fin; such an approach leads to reduced cost and complexity of the module 100.

Referring again to FIG. 2, an optional layer 155 of thermal interface material (TIM) may be applied between the frame of heat sink 140 and the flattened portion of the crest section 120. This helps provide good thermal contact. The use of TIM material to make thermal contact between the crest section 120 and the heat sink 140 frame allows easy disassembly of the battery module 100 relative to the use of an adhesive.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components. For example, a "device" according to the present invention may comprise an electrochemical conversion assembly or fuel cell, a vehicle incorporating an electrochemical conversion assembly according to the present invention, etc.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A battery module comprising:
a plurality of substantially planar battery cells facingly aligned along a common stacking axis;
a rigid heat sink disposed along at least one opposing edge of said aligned battery cells; and
a wave fin defining a generally serpentine shape with alternating straight sections and crest sections such that at least one of said aligned battery cells is disposed in a region of said wave fin defined between adjacent straight sections, said wave fin and said heat sink configured such that a substantial entirety of coolant flow delivered through said module is through said heat sink disposed at said at least one opposing edge, said wave fin defining direct contact with said rigid heat sink such that upon secure connection therebetween, a flattening shape is imparted to said crest sections by the action of said rigid heat sink.

2. The battery module of claim 1, further comprising an expansion unit made from at least one layer of compliant material, said expansion unit disposed between one of said aligned battery cells and at least another of said aligned battery cells or said straight section of said wave fin.

3. The battery module of claim 2, wherein at least one side of said expansion unit is in contact with an adjacent one of said straight sections.

4. The battery module of claim 2, wherein at least one side of said expansion unit is in contact with an adjacent one of said aligned battery cells.

5. The battery module of claim 1, further comprising a guide groove formed in at least one of said straight sections.

6. The battery module of claim 1, wherein at least one side of each of said aligned battery cells is in contact with an adjacent one of said straight sections.

7. The battery module of claim 6, wherein each side of each of said aligned battery cells is in contact with an adjacent one of said straight sections.

8. The battery module of claim 6, wherein one side of each of said aligned battery cells is in facing contact with an adjacent one of said straight sections and another side of each of said aligned battery cells is in facing contact with an expansion unit.

9. The battery module of claim 1, wherein one side of each of said aligned battery cells is in contact with an adjacent one of said straight sections and another side of each of said aligned battery cells is in contact with another of said aligned battery cells.

10. The battery module of claim 1, further comprising a layer of thermal interface material between said crest sections and said heat sink.

11. The battery module of claim 1, wherein said wave fin defines a continuous structure throughout a substantial entirety of said battery module.

12. A vehicular power source comprising:
at least one battery module comprising:
a plurality of substantially planar battery cells facingly aligned along a common stacking axis;
a rigid heat sink disposed along at least one opposing edge of said aligned battery cells; and
a wave fin defining a generally serpentine shape with alternating straight sections and crest sections such that at least one of said aligned battery cells is disposed in a region of said wave fin defined between adjacent straight sections, said wave fin and said heat sink configured such that a substantial entirety of coolant flow delivered through said module is through said heat sink disposed at said at least one opposing edge, said wave fin defining direct contact with said rigid heat sink such that upon secure connection therebetween, a flattening shape is imparted to said crest sections by the action of said rigid heat sink; and
an electric motor cooperative with said at least one battery module such that upon receipt of an electric current therefrom, said electric motor provides motive force to a vehicle.

13. The power source of claim 12, further comprising an expansion unit made from at least one layer of compliant material, said expansion unit disposed between one of said aligned battery cells and at least another of said aligned battery cells or said straight section of said wave fin.

14. A method of making a battery module, said method comprising:
corrugating a thermally conductive sheet into a continuous wave fin defining a generally serpentine shape having a plurality of substantially straight sections and a plurality of crest sections, wherein adjacent ones of said straight sections are joined together by said crest sections;
placing at least one battery cell between at least some regions defined by adjacently-spaced ones of said straight sections; and
contacting said crest sections with a rigid heat sink such that a flattening shape is imparted to said crest sections by the action of said rigid heat sink.

15. The method of claim 14, further comprising placing a compressible expansion unit between at least some of said straight sections.

16. The method of claim 15, further comprising placing a layer of thermal interface material between at least one of said crest sections and said heat sink.

17. The method of claim 15, further comprising using a comb-shaped part to promote thermal contact between said crest sections and said heat sink.

* * * * *